United States Patent [19]

Yukuta et al.

[11] 4,226,947

[45] Oct. 7, 1980

[54] FLEXIBLE URETHANE FOAMS HAVING A LOW DENSITY AND A METHOD FOR PRODUCING SAID FOAMS

[75] Inventors: Toshio Yukuta; Hiroya Fukuda; Seiji Ishii; Kazuo Utsumi, all of Yokohama, Japan

[73] Assignee: Bridgestone Tire Company Limited, Tokyo, Japan

[21] Appl. No.: 954,378

[22] Filed: Oct. 24, 1978

[30] Foreign Application Priority Data

Nov. 11, 1977 [JP] Japan .................. 52-134686

[51] Int. Cl.³ ............................................... C08G 18/14
[52] U.S. Cl. .................................... 521/107; 521/128
[58] Field of Search ............................ 521/107, 128

[56] References Cited

U.S. PATENT DOCUMENTS

| 4,010,211 | 3/1977 | Preston et al. | 521/117 |
| 4,052,345 | 10/1977 | Austin et al. | 521/107 |

Primary Examiner—Maurice J. Welsh
Attorney, Agent, or Firm—Sughrue, Rothwell, Mion, Zinn and Macpeak

[57] ABSTRACT

Flexible urethane foams having a low density and capable of preventing spontaneous combustion during production and storage are produced by compounding 5.0–12.0 parts by weight based on 100 parts by weight of polyhydroxylcompounds, of water and not less than 0.1 part by weight of aromatic amine antioxidant, further preferably not less than 0.01 part by weight of phosphorous acid triesters in the usual combination of polyhydroxyl compounds, polyisocyanates, water, catalysts, surfactants, foaming agent and other additives.

10 Claims, 1 Drawing Figure

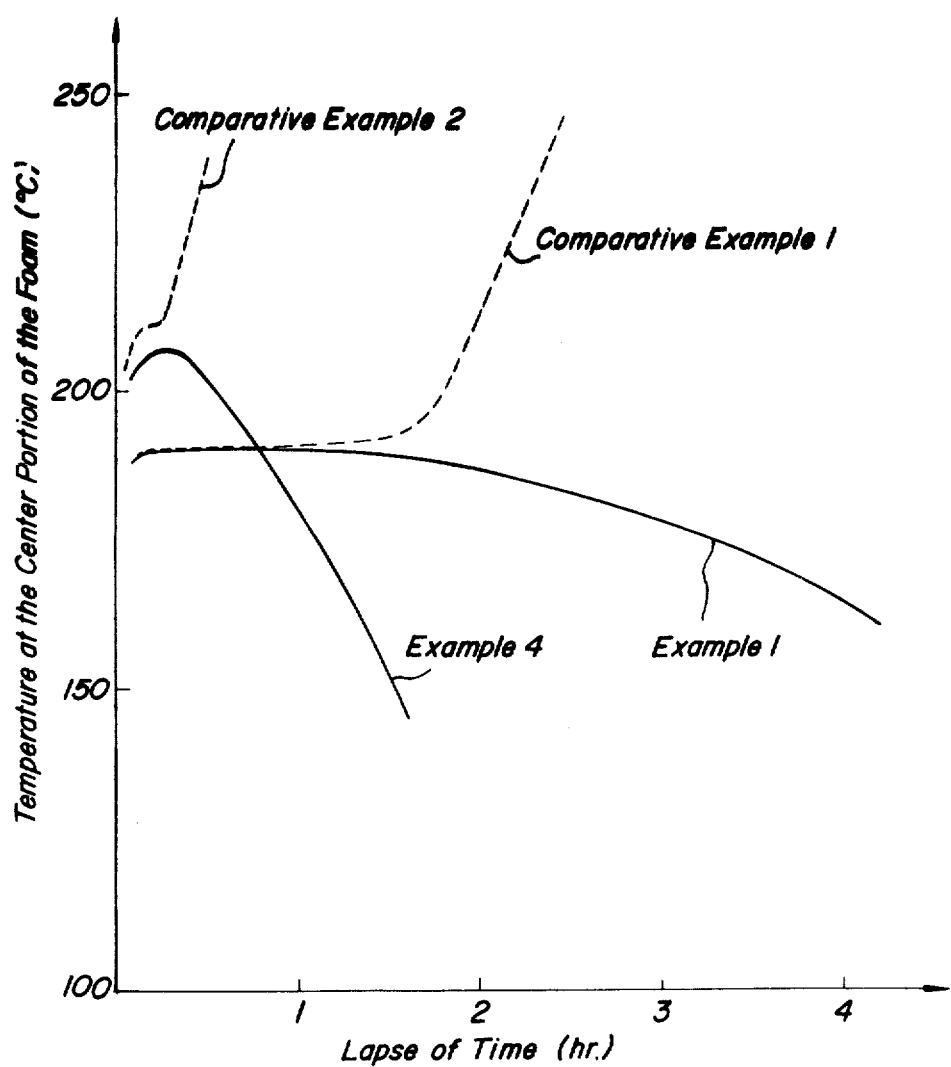

FLEXIBLE URETHANE FOAMS HAVING A LOW DENSITY AND A METHOD FOR PRODUCING SAID FOAMS

The present invention relates to flexible urethane foams having a high hardness and a low density and a method for producing said urethane foams by using water of more than the already known compounding range as the foaming agent. More particularly, the present invention relates to a method for producing flexible urethane foams having a low density which aims at prevention of spontaneous combustion during production and storage of flexible urethane foams by compounding 5.0–12.0 parts by weight based on 100 parts by weight of polyhydroxyl compounds, of water and not less than 0.1 part by weight of aromatic amine antioxidants or additionally adding not less than 0.01 part by weight of phosphorous acid triesters as the auxiliary component to lower the internal heat generation owing to the thermal oxidation after foaming.

Flexible urethane foams have been commercially available as a variety of products by properly selecting the kind of the starting materials and the production method. The process occupying presently the important position in view of mass production among the production processes is the continuous slab foaming process. A large amount of products, such as furniture and cushion materials for beds are produced by cutting, sewing, rivetting and bonding of slab stocks of the flexible urethane foams produced by this process. In the process for foaming the continuous slab, the larger the size of the slab, the more economic the production is and presently the flexible urethane foam slab stock having the cross-section of a breadth of about 2 m and a height of about 1 m has been produced. However, recently the size of the slab stock tends to become larger and fire accident is caused by the spontaneous combustion of foams immediately after foaming or during storage of the slab stock depending upon the kind of the flexible urethane foams and this has become a great problem of the process for foaming the large size slab.

The production of the flexible urethane foams utilizes the polycondensation reaction among the synthetic reaction of high molecular weight compounds and accompanies the heat generation reaction. In particular, the reaction heat of the foaming reaction from a polyisocyanate and water has become a great cause of heat generation when producing the flexible urethane foams. In this case, the reaction heat accumulated in the inner portion of the flexible urethane foam is gradually radiated to the circumference with lapse of time but the temperature in the inner portion of the foam usually reaches 165°–170° C. However, the temperature of the spontaneous combustion of the flexible urethane foams is presumably about 250°–350° C., so that if any problem is caused in the compounding recipe of the foam or the production process and there is the cause for advancing the heat generation reaction during production and storage of the flexible urethane foams, an abnormal raising of temperature occurs in the inner portion of the foam because the thermal conductivity of the flexible foam is low and the inner portion reaches the spontaneous combustion temperature and there is fear of causing fire. However, earnest studies have heretofore not been made concerning the cause of the spontaneous combustion of the flexible urethane foams in the production of the large size slab stock and particularly the countermeasure thereof. There are the following few reports (1) Bayer Technical Bulletin (published on July 15, 1963), (2) Journal of Cellular Plastics, Aug. 1968, p.293–303 and (3) British Polymer Journal Vol.8, p.41–43 (1976).

The above described publications (1) and (2) have concluded that the main cause of the spontaneous combustion is based on the abnormally high compounding level of water and polyisocyanates. The countermeasure is that the tolerable upper limit of the amount of water compounded in the production of the flexible urethane foams is 4.5–5.0 parts by weight based on 100 parts by weight of polyhydroxyl compounds and therefore the amount of water must be controlled below said value and the experiment that if 6.5 parts by weight of water is compounded, the foam always causes the spontaneous combustion, has been reported.

In addition, as the countermeasure for preventing the spontaneous combustion in the production process, the foaming process wherein the amount of polyhydroxyl compounds compounded is allowed not to be lowered than the necessary calculated amount, has been proposed.

As the patent applications for preventing the spontaneous combustion of the flexible urethane foams relating to the method of the present invention, German Laid open patent application No. 2,443,828 (published on Mar. 25, 1976) and No. 2,456,421 (published on Aug. 12, 1976) relating to "A method for detecting the deterioration reaction due to heat generation during production and storage of high molecular weight plastic, particularly urethane foams, and an apparatus therefor," have been known.

The inventors have earnestly studied the prevention of the spontaneous combustion of the flexible urethane foams and succeeded in the prevention of the spontaneous combustion in the production of the flexible urethane foams having a low density by using a large amount of water which has never been used in the conventional prior arts as the foaming agent and the present invention has been accomplished. Namely, the inventors have studied for clarifying the heat generation-heat radiation mechanism in the production of the flexible urethane foams and measured the variation of lapse of time of the temperature at the inner portion of the foam in order to analyse the behavior of the heat accumulation of the foam. As the results, it has been found that in the usual safe foaming of the flexible urethane foams wherein there is no danger of combustion, as soon as the inner portion of the foam reaches the maximum temperature (primary heat generation) of the particularly defined temperature of about 180°–185° C. owing to the compounding condition 15–45 minutes after foaming, the heat is radiated and the temperature becomes lower, but in the foaming of the flexible urethane foam, which is apt to cause the spontaneous combustion, by using a large amount of water, the secondary heat generation as shown in the curve of Comparative Example 1 in the attached drawing subsequent to the primary heat generation due to the usual reaction heat, always occurs in the foaming of the flexible urethane foam, which is apt to cause the spontaneous combustion due to use of a large amount of water.

Then, the inventors have earnestly studied the mechanism of generation of the secondary heat generation due to the abnormal heat accumulation in the inner portion of the foam, which is the great cause of the spontaneous combustion and found that the secondary heat generation is the reaction heat owing to the thermal oxidation decomposition reaction of the flexible urethane foam. Accordingly, it has been found that the spontaneous combustion can be prevented by retarding the oxidation reaction of the flexible urethane foam and by adding the substances which do not adversely affect the production and physical properties of the flexible urethane foams, among usual organic or inorganic reducing agents, that is antioxidants.

Thus, the inventors have found that the secondary heat generation owing to the thermal oxidation decomposition reaction of the flexible urethane foams can be prevented by adding aromatic amine antioxidants to the flexible urethane foams which are apt to cause the spontaneous combustion owing to the secondary heat generation or additionally adding phosphorous acid triesters as an auxiliary component and the flexible urethane foams which cause usual safe foaming and heat radiation and do not cause the spontaneous combustion, can be produced.

An amount of water to be used as the foaming agent of the flexible urethane foams in the present invention is 5.0–12.0 parts by weight based on 100 parts by weight of polyhydroxyl compounds. In general, in the production of the flexible urethane foams, it has been well known that as the amount of water compounded increases, the foaming reaction forming carbon dioxide gas owing to the reaction of water with polyisocyanate is promoted and as the result, the foam density lowers and the rate of urea bond in the foam chemical bond increases, so that the hardness of the foam is increased. However, if the amount of water compounded increased, the heat generation amount owing to the reaction with polyisocyanate increases, so that in the conventional technic for forming the flexible urethane foams, the upper limit of the amount of water compounded has been 4.5–5.0 parts by weight in view of damger of the spontaneous combustion.

However, the present invention is to provide a method for producing flexible urethane foams having a low density, which are safe in the spontaneous combustion, by using a high level of water compounded, which has never been expected in the conventional technics for producing flexible urethane foams, as the foaming agent.

An amount of aromatic amine antioxidants to be used in the present invention may be an optional amount of not less than 0.1 part by weight based on 100 parts by weight of polyhydroxyl compounds and in other words, is merely necessary to be such an amount that the secondary heat generation owing to the thermal oxidation decomposition reaction of the foams depending upon the size of the produced flexible urethane foam block is prevented and the physical properties of the foams are not adversely affected. In many cases, about 0.5 part by weight is usually sufficient.

The aromatic amine antioxidants to be used in the present invention may be commercially available substances and are not particularly limited and, for example, mention may be made of diphenylamine, 4,4'-dioctyl-diphenylamine, 4,4'-bis(4-α,α-dimethylbenzyl)diphenylamine, phenyl-β-naphthylamine, N,N'-diphenyl-p-phenylene-diamine, N-phenyl-N'-isopropyl-p-phenylenediamine, N,N'-di-β-naphthyl-p-phenylenediamine and the like. These aromatic amine antioxidants may be used alone or in admixture. Among them, 4,4'-dioctyl-diphenylamine and 4,4-bis(4-α,α-dimethylbenzyl)-diphenylamine are particularly preferable. The process for adding these amines to the flexible urethane foam composition system is not particularly limited and may be optional. That is, if necessary, these amines are used by dispersing or dissolving in polyhydroxyl compound, polyisocyanate or catalyst system or these amines are dissolved in solvents which do not disturb the production of the foams to form the solutions and the solutions are added upon production of the flexible urethane foams.

In general, if the secondary heat generation owing to the thermal oxidation decomposition reaction of the flexible urethane foams is prevented, there is no fear of the spontaneous combustion and simultaneously the scorch coloration due to the excessive heat accumulation is necessarily prevented. Accordingly, when the aromatic amine antioxidants are compounded in the flexible urethane foam composition system, which causes the spontaneous combustion due to the secondary heat generation, the secondary heat generation is not only prevented, but also the scorch coloration is prevented, so that in many cases, the satisfactory urethane foams having the commercial value can be obtained by compounding only the aromatic amine antioxidants.

However, when there is still problem in the coloration in the flexible urethane foams in which the secondary heat generation causing the spontaneous combustion is prevented by compounding the aromatic amine antioxidants, phosphorous acid triesters are added as an auxiliary antioxidant. When phosphorous acid triesters are merely compounded, it is impossible to prevent the scorch coloration of the flexible urethane foams concerning the present invention but if said triesters are added as an auxiliary agent of the aromatic amine antioxidant, the noticeable effect can be developed.

An amount of phosphorous acid triesters used in the present invention may be an optional amount of not less than 0.01 part by weight based on 100 parts by weight of polyhydroxyl compounds and in other words, it is merely necessary to add such an amount that the scorch coloration degree of the produced flexible urethane foam block does not damage the commercial value of the urethane foams. In general, it is preferred to add about 0.25 part by weight based on the amount of the aromatic amine antioxidant compounded of 0.5 parts by weight.

The phosphrous acid triesters to be used in the present invention may be the usually commercially available substances and are not particularly limited and include, for example triphenyl phosphite, phenyl-di-isooctyl phosphite, phenyl-di-isodecyl phosphite, tris(isooctyl)-phosphite, tris(isodecyl)phosphite and the like. These phosphorous acid triesters may be used alone or in admixture as the auxiliary component of the aromatic amine antioxidant. Among them, triphenyl phosphite is particularly preferable. The process for adding these triesters to the flexible urethane foam composition system may be optional and is not particularly limited.

Polyhydroxyl compounds, polyisocyanates, catalysts, surfactants, and foaming agents and other additives may be well known substances used in the production of the flexible urethane foams already carried out and are not particularly limited.

The present invention will be explained in more detail.

For better understanding of the invention, reference is taken to the accompanying drawing, wherein:

FIG. 1 is the curves showing the relation of the temperature at the center portion of the urethane foam to the lapse of time after foaming.

The following examples are given for the purpose of illustration of this invention and are not intended as limitations thereof.

EXAMPLE 1

A simulation foaming process wherein the foaming behavior of a machine for producing a large size of flexible urethane foam can be favorably reproduced in a small scale by a hand mixing, has been developed. When a flexible urethane foam having a foam block size of about 1 m × 1 m × 1 m was foamed by a hand mixing process (Jiffy mixer, revolution number: 5,800 rpm) by adjusting the liquid temperature of the starting materials of the flexible urethane foam at higher than 25° C. and then left to stand in the state that the bottom portion of a paper mold is removed, it has been found that the heat generation behavior at the center portion of the foam has always the correlation to the spontaneous combustion when foaming by using a machine for producing a large size of urethane foam slab.

100 parts by weight of poly(oxypropylene)triol (Trade Mark: MN-3050, made by Mitsui Nisso K.K., number average molecular weight: about 3,000, OH value: 56) was heated at 50° C. and 0.5 part by weight of 4,4'-bis(4-α,α-dimethylbenzyl)diphenylamine Trade Mark: Naugard 445, made by Uniroyal Co.) previously uniformly dissolved therein and the resulting solution was allowed to cool. Then, 0.05 part by weight of triethylenediamine, 0.3 part by weight of stannous octoate, 6.5 parts by weight of distilled water, 1.4 parts by weight of silicone surfactant (Trade Mark: L-520, made by Nippon Unicor) were added thereto. The resulting mixture was thoroughly stirred for about 60 seconds by Jiffy mixer. To the homogeneous mixture was added 77.7 parts by weight of tolylene diisocyanate (Trade Mark: TDI-80: 2,4/2,6-isomer ratio 80/20, made by Nippon Polyurethane K.K.) so that NCO index becomes 105 and the mixture was stirred at a high speed of 5,800 rpm for 10 seconds and rapidly poured into a paper mold (1 m × 1 m × 1 m) previously provided with a thermocouple at the center portion for measuring the temperature. The foaming started and after about 71 seconds, the foam raising was completed. The relation of the temperature at the center portion of the foam due to the heat generation and the heat radiation measured by the thermocouple to the lapse of time is shown in the attached drawing.

In the same manner as described above except that the aromatic amine antioxidant, 4,4'-bis(4-α,α-dimethylbenzyl)diphenylamine was not added, a foam of Comparative Example 1 was produced.

As seen from the attached drawing, in the case of Example 1, the temperature at the center portion of the foam was raised to about 191° C. about one hour after starting the foaming and then the heat was gradually radiated and the temperature lowered. The scorch coloration in the inner portion of the foam after allowing to cool was 4.9 in the color difference against white color portion and the good flexible urethane foam having a low density (0.0165 g/cm$^3$), which has no problem in the commercial value, was obtained.

On the contrary, in the case of Comparative Example 1, the spontaneous combustion due to secondary heat generation occured and the very noticeable scorch coloration and the heat deterioration occured in the inner portion of the foam and the spontaneous combustion was caused.

EXAMPLE 2

Instead of the aromatic amine antioxidant of 4,4'-bis(4-α,α-dimethylbenzyl)diphenylamine in Example 1, 1.0 part by weight of diphenylamine was used and the foaming was effected in the same manner as described in Example 1 except that the liquid temperature was adjusted at 30° C. and the foaming was effected under the condition that the spontaneous combustion is apt to be caused, and the flexible urethane foam having a low density, which did not cause the secondary heat generation causing the spontaneous combustion, was obtained.

EXAMPLE 3

The foaming was effected in the same manner as described in Example 1, except that 0.25 part by weight of triphenyl phosphite was additionally added to 4,4'-bis(4-α,α-dimethylbenzyl)diphenylamine of the aromatic amine antioxidant in Example 1 as the auxiliary component and the flexible urethane foam having a good foaming stability and a low density, which does not cause the secondary heat generation causing the spontaneous combustion, was obtained.

The scorch coloration at the center portion of the foam was the color difference of 3.9 against the white color portion and from the comparison with the result of Example 1, it can be seen that when phosphorus acid triester is added to the aromatic amine antioxidant as the auxiliary component, the scorch coloration degree is decreased.

EXAMPLE 4

When the foaming was effected in the same manner as described in Example 1, except that the block size of the foam in Example 1 was varried to 60 cm × 60 cm × 80 cm (height), 0.5 part by weight of 4,4'-dioctyldiphenylamine (Trade Mark: Vanlube 81, made by Vanderbilt Co.) was used instead of 4,4'-bis(4-α,α-dimethylbenzyl)diphenylamine, 10.0 parts by weight of water was used and the liquid temperature was adjusted to 20° C., the raising of the foam was completed after about 114 seconds.

The relation of the temperature at the center portion of the foam due to the heat generation and the heat radiation measured by the thermocouple to the lapse of time is shown in the attached drawing.

In the same manner as described above except that the aromatic amine antioxidant, 4,4'-doctyldiphenylamine was not added, a foam of Comparative Example 2 was produced.

As seen from the attached drawing, in the case of Example 4, the temperature at the center portion of the foam was raised to about 207° C. about 20 minutes after starting the foaming and then the heat was gradually radiated and the temperature lowered. The scorch coloration in the inner portion of the foam after allowing to cool was not substantially recognized and the flexible urethane foam having a low density (0.0120 g/cm$^3$) and a good foam stability was obtained. On the contrary, in the case of Comparative Example 2, the sudden secondary heat generation as shown in the drawing occured at the center portion of the foam and the spontaneous combustion was caused.

What is claimed is:

1. In a method for producing flexible urethane foams having a low density and capable of preventing spontaneous combustion during production and storage of flexible urethane foams by combining polyhydroxyl compounds, polyisocyanates, water, catalysts, surfactants, foaming agents and other additives, the improvement which comprises using 5.0–12.0 parts by weight of water based on 100 parts by weight of the polyhydroxyl compounds, and not less than 0.1 part by weight of aromatic amine antioxidants.

2. The method as claimed in claim 1, wherein not less than 0.01 part by weight of phosphorous acid triesters is added as an auxiliary component of the aromatic amine antioxidant.

3. The method as claimed in claim 1, wherein the aromatic amine antioxidant is at least one selected from the group consisting of diphenylamine, 4,4'-dioctyl-diphenylamine, 4,4'-bis(4-α,α-dimethylbenzyl)diphenylamine, phenyl-β-naphthylamine, N,N'-diphenyl-p-phenylenediamine, N-phenyl-N'-isopropyl-p-phenylenediamine and N,N'-di-β-naphthyl-p-phenylenediamine.

4. The method as claimed in claim 2, wherein the phosphorous acid triester is at least one selected from the group consisting of triphenyl phosphite, phenyl-di-isooctyl phosphite, phenyl-di-isodecyl phosphite, tris-(isooctyl) phosphite, and tris(isodecyl)phosphite.

5. The method as claimed in claim 3, wherein the aromatic amine antioxidant is at least one selected from the group consisting of 4,4'-dioctyl-diphenylamine and 4,4'-bis(4-α,α-dimethylbenzyl)diphenylamine.

6. The method as claimed in claim 4, wherein the phosphorous acid triester is triphenyl phosphite.

7. The method as claimed in claim 1, wherein an amount of the aromatic amine antioxidant is 0.3–1.0 part by weight based on 100 parts by weight of the polyhydroxyl compound.

8. The method as claimed in claim 2, wherein the amount of the phosphorous acid triester is 0.2–0.3 part by weight based on 100 parts by weight of the polyhydroxyl compound.

9. Flexible urethane foams having a low density obtained by compounding and foaming polyhydroxyl compounds, polyisocyanates, water, catalysts, surfactants, foaming agents and other additives, the improvement which comprises the use of 5.0–12.0 parts by weight of water based on 100 parts by weight of the polyhydroxyl compounds, and not less than 0.1 part by weight of aromatic amine antioxidants in the foams to obtain urethane foams capable of preventing spontaneous combustion during storage.

10. The urethane foams as claimed in claim 9, wherein not less than 0.01 part by weight of phosphorous acid triesters is added as an auxiliary component of the aromatic amine antioxidant.

* * * * *